United States Patent
Hershman et al.

(10) Patent No.: US 10,296,738 B2
(45) Date of Patent: May 21, 2019

(54) SECURE INTEGRATED-CIRCUIT STATE MANAGEMENT

(71) Applicant: Nuvoton Technology Corporation, Hsin-chu (TW)

(72) Inventors: Ziv Hershman, Givat Shmuel (IL); Yossi Talmi, Zur Moshe (IL); Dan Morav, Herzliya (IL)

(73) Assignee: Nuvoton Technology Corporation, Hsin-Chu (TW)

( * ) Notice: Subject to any disclaimer, the term of this patent is extended or adjusted under 35 U.S.C. 154(b) by 218 days.

(21) Appl. No.: 15/585,260

(22) Filed: May 3, 2017

(65) Prior Publication Data
US 2018/0322278 A1 Nov. 8, 2018

(51) Int. Cl.
| G06F 21/00 | (2013.01) |
| G06F 21/55 | (2013.01) |
| G06F 3/06 | (2006.01) |
| G06F 11/10 | (2006.01) |
| G06F 21/60 | (2013.01) |

(52) U.S. Cl.
CPC ............ G06F 21/55 (2013.01); G06F 3/0604 (2013.01); G06F 3/0623 (2013.01); G06F 3/0634 (2013.01); G06F 3/0679 (2013.01); G06F 11/1004 (2013.01); G06F 21/602 (2013.01)

(58) Field of Classification Search
CPC ....................................................... G06F 21/55
USPC .......................................................... 726/23
See application file for complete search history.

(56) References Cited

U.S. PATENT DOCUMENTS

| 5,394,367 A * | 2/1995 | Downs ................... G11C 7/24 342/51 |
| 5,559,956 A | 9/1996 | Sukegawa |
| 5,954,818 A | 9/1999 | Dalvi et al. |
| 6,073,243 A | 6/2000 | Dalvi et al. |
| 7,398,554 B1 | 7/2008 | Falik |
| 8,151,072 B2 * | 4/2012 | Stiglic ................. G06F 12/1425 711/100 |
| 9,202,073 B2 | 12/2015 | Marston et al. |
| 9,262,259 B2 | 2/2016 | Ashkenazi |
| 2003/0126513 A1 | 7/2003 | Wuidart |
| 2004/0246781 A1 * | 12/2004 | Liu ....................... G11C 16/22 365/185.33 |

(Continued)

OTHER PUBLICATIONS

"TCG PC Client Platform TPM Profile (PTP) Specification", Family 2.0, Level 00, Revision 00.43, 152 pages, Jan. 26, 2015.

*Primary Examiner* — Longbit Chai
(74) *Attorney, Agent, or Firm* — Kligler & Associates

(57) ABSTRACT

An apparatus includes a Non-Volatile Memory (NVM) and a controller. The controller is configured to store in the NVM a state array, which includes multiple words. In each word, one or more bits are designated as lock-bits. The controller is further configured to set an operational state for the apparatus based on the lock-bits of the state array, by (i) deciding whether each word in the state array is locked or unlocked by comparing the lock-bits of that word to respective expected lock values, (ii) if all the words in the state array are found locked, setting the apparatus to a locked state, (iii) if all the words in the state array are found unlocked, setting the apparatus to an unlocked state, and (iv) if one or more of the words are found locked and one or more other words are found unlocked, setting the apparatus to an error state.

14 Claims, 1 Drawing Sheet

(56) References Cited

U.S. PATENT DOCUMENTS

2009/0125726 A1  5/2009  Iyer et al.
2011/0228601 A1  9/2011  Olbrich et al.

* cited by examiner

SECURE INTEGRATED-CIRCUIT STATE MANAGEMENT

FIELD OF THE INVENTION

The present invention relates generally to secure data storage, and particularly to methods and systems for secure Integrated Circuit (IC) state management.

BACKGROUND OF THE INVENTION

In various systems and applications, secure Integrated Circuits (ICs) store sensitive information, e.g., in Flash memory or other Non-Volatile Memory (NVM). Various techniques are known in the art for preventing unauthorized access to information stored on NVM. For example, U.S. Pat. No. 8,151,072, whose disclosure is incorporated herein by reference, describes an electronic device including a NVM having a plurality of words 1 . . . N whose read and/or write access can be locked. A protection register is formed of two protection words A and B, which are alternately active and inactive during successive locking of words 1 . . . N of the programmable memory. The state of the protection register is defined by the active word. An initially active word is not deleted until the content thereof has been copied into the inactive word. Once the content has been altered in accordance with the lock command, the initially inactive word becomes the active word of the protection register.

U.S. Pat. No. 9,202,073, whose disclosure is incorporated herein by reference, describes security measures for shielding or protecting data or sensitive signals on an Integrated Circuit (IC). The disclosed systems and methods can allow erasing sensitive data when access is not locked, locking out access to sensitive data during normal operations through both indirect and direct means, and shielding sensitive signals from invasive probing or manipulation.

U.S. Pat. No. 9,262,259, whose disclosure is incorporated herein by reference, describes techniques for One-Time Programmable (OTP) integrated circuit security. An example method includes sampling values of multiple OTP memory arrays and comparing the sampled value of each OTP memory array with the sampled value of each other OTP memory array and with an un-programmed OTP memory array value. The method further includes determining if an integrated circuit performance fault has occurred based on the compared sampled values.

U.S. Pat. No. 5,954,818, whose disclosure is incorporated herein by reference, describes a method of writing to memory cells in a Flash memory device that includes first and second memory arrays. The first memory array includes memory blocks. The second independent memory array includes block lock-bits each corresponding to one of the memory blocks. The method of writing to a memory cell in one of the memory blocks of the first memory array includes issuing a command to write to the memory cell, determining if a corresponding block lock-bit in the second independent memory array is set, and writing to the memory cell if the corresponding block lock-bit is not set.

U.S. Pat. No. 6,073,243, whose disclosure is incorporated herein by reference, describes a Flash memory device including a first memory array, block locking circuitry, and control circuitry. The memory array includes a plurality of memory blocks. The block locking circuitry includes a plurality of block lock-bits and a master lock-bit. Each block lock-bit corresponds to one of the plurality of memory blocks and indicates whether the corresponding memory block is locked. The master lock-bit indicates whether the plurality of block lock-bits are locked. Control circuitry is configured to receive a passcode that causes the control circuitry to override the master lock-bit.

SUMMARY OF THE INVENTION

An embodiment of the present invention that is described herein provides an apparatus including a Non-Volatile Memory (NVM) and a controller. The controller is configured to store in the NVM a state array, which includes multiple words. In each word, one or more bits are designated as lock-bits. The controller is further configured to set an operational state for the apparatus based on the lock-bits of the state array, by (i) deciding whether each word in the state array is locked or unlocked by comparing the lock-bits of that word to respective expected lock values, (ii) if all the words in the state array are found locked, setting the apparatus to a locked state, (iii) if all the words in the state array are found unlocked, setting the apparatus to an unlocked state, and (iv) if one or more of the words are found locked and one or more other words are found unlocked, setting the apparatus to an error state.

In some embodiments, the controller is configured to designate, in the words of the state array, one or more bits other than the lock-bits as key-bits, and to perform a cryptographic operation using a key derived from the key-bits. In an embodiment, the controller is configured to store the key-bits and the lock-bits in interleaved memory cells of the NVM. In a disclosed embodiment, the controller is configured to set the expected lock values, to which the lock-bits of a given word are compared, to equal a function of the key-bits of the given word.

In some embodiments, upon setting the apparatus to the error state, the controller is configured to perform a protective action that prevents access to information stored in the IC. In an example embodiment, the controller is configured to set the operational state upon power-up. In some embodiments, the controller is configured to retrieve the expected lock values from read-only hardware.

There is additionally provided, in accordance with an embodiment of the present invention, a method for operating an Integrated Circuit (IC). The method includes storing in a Non-Volatile Memory (NVM) a state array, which includes multiple words, wherein one or more bits in each word are designated as lock-bits. An operational state is set for the IC based on the lock-bits of the state array, by (i) deciding whether each word in the state array is locked or unlocked by comparing the lock-bits of that word to respective expected lock values, (ii) if all the words in the state array are found locked, setting the IC to a locked state, (iii) if all the words in the state array are found unlocked, setting the IC to an unlocked state, and (iv) if one or more of the words are found locked and one or more other words are found unlocked, setting the IC to an error state.

The present invention will be more fully understood from the following detailed description of the embodiments thereof, taken together with the drawings in which:

DETAILED DESCRIPTION OF EMBODIMENTS

Overview

Figure 1:
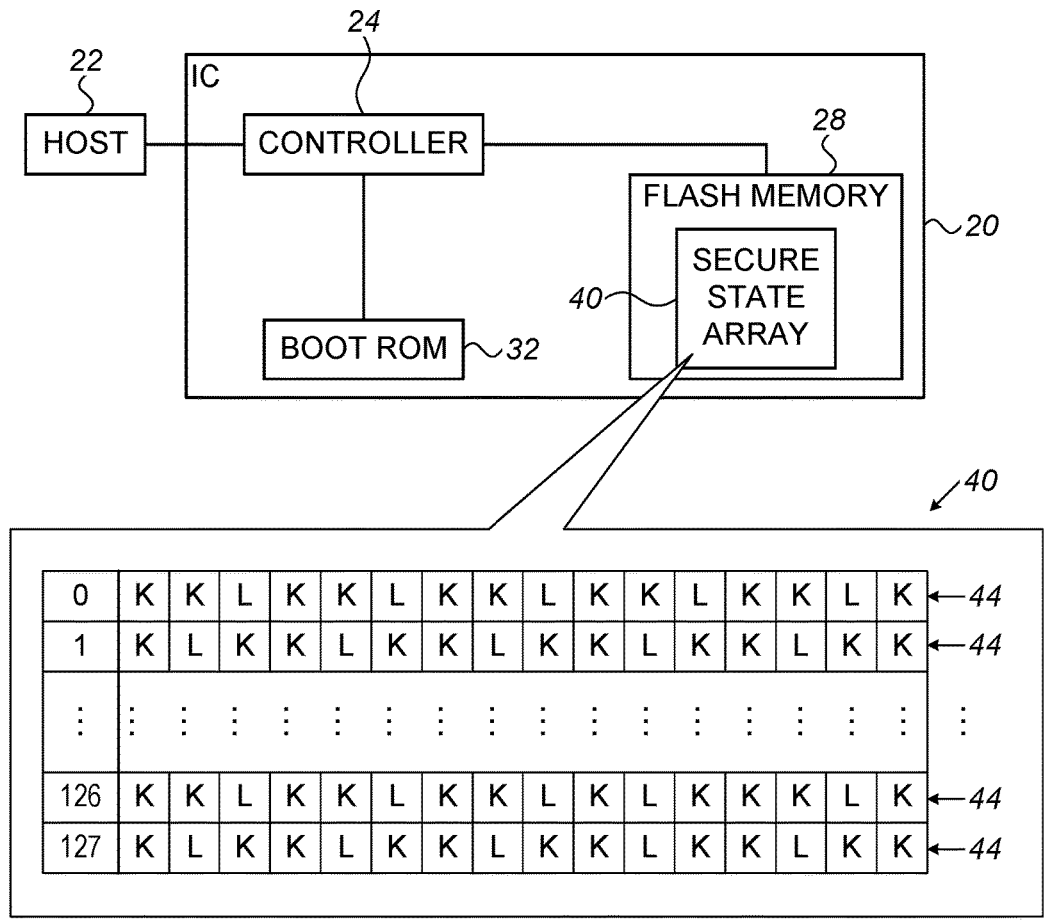
FIG. 1 is a block diagram that schematically illustrates a secure Integrated Circuit (IC) comprising a NVM, in accordance with an embodiment of the present invention.

Embodiments of the present invention that are described herein provide improved methods and systems for preventing unauthorized access to information in secure Integrated Circuits (ICs). In example embodiments, the disclosed techniques protect Non-Volatile Memory (NVM) that stores sensitive information against external tampering, such as laser or Electromagnetic Interference (EMI) attacks.

In some embodiments, a secure IC comprises a NVM and a controller. Among other functions, the controller performs cryptographic operations (e.g., encryption, decryption and/or authentication) on information (e.g., data and/or software code) stored on the NVM or on other memory using one or more cryptographic keys, and also operates the IC in accordance with multiple operational states.

One of the states is an "unlocked state" in which it is possible to freely access (e.g., write, read or erase) the NVM, operate various debugging functions (e.g., JTAG) and test modes, access internal memory such as Random Access Memory (RAM) and hardware registers, and/or otherwise freely operate IC functions. This state may be used, for example, during development or during production, before the secure IC is delivered to its end user. Another state is a "locked state" in which the IC is in its functional mode. Typically, in this state, the debug capabilities of the IC are off, and the IC can only be accessed and used through its intentional functional interface. The locked state is typically the only state exposed to the end user. A third state is an "error state" in which the IC is not locked, but also not legitimately unlocked. This state may be reached, for example, in response to detecting an attempt to tamper with the NVM. Additional states may also be defined as appropriate.

In some embodiments, the NVM holds an array of multiple words referred to as a "state array." The state array is used for maintaining the operational state of the IC and for securing the key or keys against external tampering. The use of the state array prevents unauthorized parties from accessing (e.g., reading, modifying or erasing) secure data content, and from further exploring the IC using its debug features. In each word of the state array, one or more bits are designated as "key-bits" and one or more other bits are designated as "lock-bits." The key-bits are used for generating the cryptographic key or keys. The lock-bits are used for detecting external attacks on the NVM.

In some embodiments, the lock-bits of each word of the state array determine the state of that word. A given word of the state array is regarded as locked if all the lock-bits of that word are equal to a respective expected lock value, and is regarded as unlocked otherwise. The lock value of a word (the expected combination of lock-bit values that indicates the word is locked) may vary from one word to another in the state array. The IC is regarded as locked (i.e., in the locked state) if all the words in the state array are locked. If all the words in the state array are unlocked, the IC is regarded as unlocked (i.e., in the unlocked state). If one or more words are locked, and one or more other words are unlocked, the IC is regarded as being in the error state.

The positions of the key-bits and the lock-bits are typically interleaved with one another, and may differ from one word to another. Since the lock-bits and the key-bits are interleaved in close physical proximity to one another, any external tampering with the lock-bits is highly likely to corrupt one or more of the key-bits. Therefore, even if an external attack somehow succeeds in unlocking all the words, it will most likely corrupt many of the key-bits and render the cryptographic key or keys irrecoverable.

In a typical embodiment, the controller checks the state array on power-up and sets the appropriate operational state for the IC. For each word in the state array, the controller compares the lock-bits to the corresponding expected lock value and decides whether this word is locked or unlocked. If one or more of the words are found locked and one or more other words are found unlocked, the controller concludes that an attack has been attempted, and sets the IC to the error state. For example, the controller may erase the entire content of the NVM, disable any further access to the IC, and/or take other suitable protective measures.

System Description

FIG. 1 is a block diagram that schematically illustrates a secure Integrated Circuit (IC) 20, in accordance with an embodiment of the present invention. IC 20 stores information securely for a host 22. IC 20 may be used for serving any suitable host 22 in any suitable system, for example in a secure storage device.

IC 20 comprises a controller 24, which stores the information in a Flash memory 28. The embodiments described herein refer mainly to Flash memory, but the disclosed techniques are applicable to any other suitable type of NVM. In the present example IC 20 further comprises a boot Read Only Memory (ROM) 32 that stores the software of controller 24. In an embodiment, the software stored in ROM 32 comprises booter software, i.e., software code that boots controller 24 from ROM 32 on power-up.

The system and IC configuration shown in FIG. 1 are example configurations that are depicted purely for the sake of conceptual clarity. In alternative embodiments, any other suitable configurations can be used. Typically, controller 24 and Flash memory 28 are fabricated such that (i) it is all but impossible to separate the Flash memory and the controller from one another, and (ii) the Flash memory is accessible only by authorization from the controller. In an embodiment, controller 24 and Flash memory 28 may be fabricated in the same IC package or on the same silicon die. Elements that are not mandatory for understanding of the disclosed techniques have been omitted from the figure for the sake of clarity.

In various embodiments, the different system elements shown in FIG. 1 may be implemented using any suitable hardware, such as in an Application-Specific Integrated Circuit (ASIC) or Field-Programmable Gate Array (FPGA). Alternatively, some of the functions of IC 20, e.g., the functions of controller 24, may be implemented in software, or using a combination of software and hardware elements.

In some embodiments, controller 24 comprises a general-purpose processor, which is programmed in software to carry out the functions described herein. The software may be downloaded to the processor in electronic form, over a network or from host 22, for example, or it may, alternatively or additionally, be provided and/or stored on non-transitory tangible media, such as magnetic, optical, or electronic memory.

Secure Management of IC Operational States

In some embodiments, controller 24 performs cryptographic operations on information, e.g. information stored on Flash memory 28, using one or more cryptographic keys (referred to herein simply as "keys" for brevity). For example, the controller may encrypt user data that is received for storage from host 22 before storing the data on Flash memory 28, and decrypt the data read from Flash memory 28 before sending it to host 22. Additionally or alternatively, the controller may encrypt internal flags or other management information, authenticate and/or encrypt internal software code, or perform any other suitable cryptographic operation. Each of these cryptographic operations may use a different key.

In some embodiments of the present invention, controller 24 stores a state array 40 in Flash memory 28. An example of state array 40 is shown in the inset at the bottom of FIG. 1. As can be seen in the figure, state array 40 comprises multiple words 44. In each word 44, one or more bits are designated as "key-bits" (denoted "K" in the figure) and one or more other bits are designated as "lock-bits" (denoted "L" in the figure).

In the example of FIG. 1, state array 40 comprises a total of 128 words, each word comprises sixteen bits, of which five are designated as lock-bits and eleven are designated as key-bits. These numerical values, as well as the specific positions of the key-bits and the lock-bits, shown in FIG. 1, are depicted purely by way of example. In alternative embodiments, any other suitable state-array configuration can be used.

The key-bits are used by controller 24 for generating the cryptographic key or keys. For example, controller 24 may generate a key by applying a hash function (e.g., SHA) to some or all of the key-bits. In an embodiment, for simplicity of implementation, controller 24 may generate the key by applying a hash function to the entire state array, including both key-bits and lock-bits. The lock-bits are used for detecting external attacks on the NVM.

The positions of the key-bits and the lock-bits in words 44, and across array 40, are typically interleaved with one another. This interleaving typically means that the key-bits and the lock-bits are stored in Flash memory cells that are physically interleaved with one another, possibly even in the same memory cells in the case of Multi-Level Cell (MLC) Flash memory.

As such, tampering with one or more of the lock-bits is expected to corrupt at least one of the key-bits. In other words, a physical attack on the lock-bits (e.g., by externally irradiating selected regions of IC 20 with laser or focused electromagnetic radiation) will most likely render the cryptographic key irrecoverable, even if the attacker succeeds in unlocking the IC and gains full access to state array 40.

In the disclosed embodiments, controller 24 regards any word 44 of state array 40 as locked if all the lock-bits of that word are equal to a respective predefined lock value. Otherwise, the word is considered unlocked. The lock values may vary from one word 44 to another in state array 40. IC 20 as a whole is regarded as locked if all words 44 of state array 40 are locked. If all words 44 in the state array are unlocked, IC 20 as a whole is regarded as unlocked. If one or more words 44 are locked, and one or more other words 44 are unlocked, controller 24 regards IC 20 as being in the error state.

When specifying the lock values, it is typically desirable to select values that do not occur inadvertently when Flash memory device 28 is first powered-up. Typically, upon the first power-up the state array is expected be in the unlocked state. As such, unintentional occurrence of a lock value may result in an irrecoverable error state.

In some embodiments, the lock values of the various words 44 are predefined and stored in read-only hardware, e.g., in boot ROM 32. In another embodiment, the lock-bits and the key-bits can be merged together logically. For example, in some embodiments the lock value of each word 44 is defined as a function of the key-bits of the same word. For example, each lock bit can be defined as a XOR of several key bits. In some embodiments, the lock value of a word 44 is defined as an error detection function of the key-bits of that word. Any suitable error detection function, or error detection code, can be used for this purpose. In one example embodiment, the lock value of each word 44 are calculated by calculating a Cyclic Redundancy Check (CRC) over the key-bits of that word. The CRC result is used as the lock value (the expected values of the key bits).

In some embodiments, controller 24 evaluates the state of IC 20 as part of the boot process at power-up. The controller's boot software typically compares the lock-bits of each word 44 to the expected lock value, and decides whether the IC is locked, unlocked or in an error state. When the lock values are stored in boot ROM 32, the boot software typically reads them from the boot ROM in order to perform the comparison. When the lock values are calculated as an error-detection function of the key-bits, the boot software typically calculates the error-detection function over the key-bits of each word 44, and compares the result to the lock-bits of that word.

Figure 2:
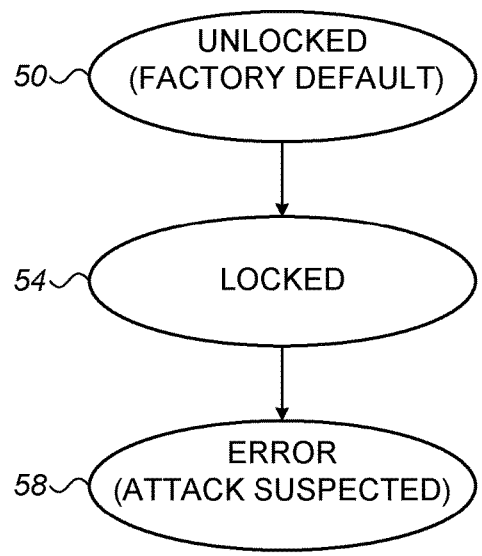
FIG. 2 is a state diagram that schematically illustrates operational states of the IC of FIG. 1, in accordance with an embodiment of the present invention.

FIG. 2 is a state diagram that schematically illustrates operational states of IC 20, in accordance with an embodiment of the present invention. In the present example, as described above, controller 24 operates IC 20 in accordance with three possible states, namely an unlocked state 50, a locked state 54, and an error state 58.

In one example embodiment, the three states are defined as follows:

The unlocked state is the factory default state in which the IC wakes-up on the initial power-up. In this state, with is also referred to as a development state, engineering test modes and debugger interface (e.g. JTAG) are typically enabled. IC 20 as a whole may or may not be functional. Controller 24 typically enables writing and reading of information to and from Flash memory 28.

The locked state is typically the fully functional state in which IC 20 is delivered to the end-user. This is typically the only state that the end-user is permitted to use. Access to the IC is limited to the intended usage as defined by the device interface specification. For example, the Trusted Platform Module (TPM) interface may be defined as specified in "TCG PC Client Platform TPM Profile (PTP) Specification," Family "2.0", Level 00, Revision 00.43, Jan. 26, 2015, which is incorporated herein by reference.

In the error state, controller 24 concludes that an attack is suspected, and takes appropriate protective measures to prevent access to secure information in Flash memory 28 or otherwise in IC 20. Example protective measures may comprise, for example, erasing some or all of the content of Flash memory 28, blocking access to one or more functions of IC 20, transitioning IC 20 to a fail mode in which the IC is no longer functional, and/or any other suitable measure.

In order to transition from unlocked state 50 to locked state 54 ("locking the IC"), the lock values (the expected values of the lock-bits) are written into the appropriate locations in array 40. The values of the key-bits are also written into the appropriate locations in the state array. After populating the state array, IC 20 may be powered-down.

At subsequent power-up, IC 20 wakes up in locked state 54.

During the boot process, controller 24 checks state array 40. For each word 44, controller 24 compares the values of the lock-bits to the corresponding lock values. If the bit values match, controller 24 regards this word as unlocked. If the bit values do not match, controller 24 regards this word as locked. If all words 44 are found locked, controller 24 remains in locked state 54. If all words 44 are found unlocked, controller 24 transitions to unlocked state 50. If state array 40 is found inconsistent (i.e., one or more words 44 are locked and one or more other words 44 are found unlocked) controller 24 concludes that an attack may have occurred, and transitions to error state 58. As described above, in the error state controller 24 takes suitable protective measures to prevent unauthorized access to information in IC 20.

The state diagram of FIG. 2, including state definitions and transitions between states, is an example state diagram that is chosen purely for the sake of conceptual clarity. In alternative embodiments, any other suitable states and transitions can be used.

Although the embodiments described herein mainly address TPMs, the methods and systems described herein can also be used in other applications, such as in smartcards or other secure devices having embedded NVM.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
a Non-Volatile Memory (NVM); and
a controller, which is configured to:
store in the NVM a state array, which comprises a plurality of words, wherein, in each word of said plurality of words, one or more bits within the each word of said plurality of words are designated as lock-bits; and
set an operational state for the apparatus based on the lock-bits of the state array, by:
determining whether each word of said plurality of words in the state array is locked or unlocked by comparing the designated lock-bits of that each word of said plurality of words to respective expected lock values stored at the apparatus;
if all the words of said plurality of words in the state array are found locked, setting the apparatus to a locked state;
if all the words of said plurality of words in the state array are found unlocked, setting the apparatus to an unlocked state; and
if one or more of the words of said plurality of words are found locked and one or more other words are found unlocked, setting the apparatus to an error state, in which the apparatus is not locked but also not legitimately unlocked, to prevent unauthorized access to information in the apparatus.

2. The apparatus according to claim 1, wherein the controller is configured to designate, in the words of the state array, one or more bits other than the lock-bits as key-bits, and to perform a cryptographic operation using a key derived from the key-bits.

3. The apparatus according to claim 2, wherein the controller is configured to store the key-bits and the lock-bits in interleaved memory cells of the NVM.

4. The apparatus according to claim 2, wherein the controller is configured to set the expected lock values, to which the lock-bits of a given word are compared, to equal a function of the key-bits of the given word.

5. The apparatus according to claim 1, wherein, upon setting the apparatus to the error state, the controller is configured to perform a protective action that prevents access to information stored in the IC.

6. The apparatus according to claim 1, wherein the controller is configured to set the operational state upon power-up.

7. The apparatus according to claim 1, wherein the controller is configured to retrieve the expected lock values from read-only hardware.

8. A method for operating an apparatus including an Integrated Circuit (IC), the method comprising:
storing in a Non-Volatile Memory (NVM) a state array, which comprises a plurality of words, wherein, in each word of said plurality of words, one or more bits are designated as lock-bits; and
setting an operational state for the IC based on the lock-bits of the state array, by:
determining whether each word of said plurality of words in the state array is locked or unlocked by comparing the designated lock-bits of that each word of said plurality of words to respective expected lock values stored at the apparatus;
if all the words of said plurality of words in the state array are found locked, setting the IC to a locked state;
if all the words of said plurality of words in the state array are found unlocked, setting the IC to an unlocked state; and
if one or more of the words of said plurality of words are found locked and one or more other words are found unlocked, setting the IC to an error state, in which the apparatus is not locked but also not legitimately unlocked, to prevent unauthorized access to information in the IC.

9. The method according to claim 8, wherein storing the state array comprises designating, in the words of the state array, one or more bits other than the lock-bits as key-bits, and performing a cryptographic operation using a key derived from the key-bits.

10. The method according to claim 9, wherein storing the state array comprises storing the key-bits and the lock-bits in interleaved memory cells of the NVM.

11. The method according to claim 9, and comprising setting the expected lock values, to which the lock-bits of a given word are compared, to equal a function of the key-bits of the given word.

12. The method according to claim 8, wherein setting the IC to the error state comprises performing a protective action that prevents access to information stored in the IC.

13. The method according to claim 8, wherein setting the operational state is performed upon power-up.

14. The method according to claim 8, wherein comparing the lock-bits to the expected lock values comprises retrieving the expected lock values from read-only hardware.

* * * * *